United States Patent
Bond et al.

(10) Patent No.: US 7,101,810 B2
(45) Date of Patent: Sep. 5, 2006

(54) TRANSPARENT ARTICLE HAVING PROTECTIVE SILICON NITRIDE FILM

(75) Inventors: Robert Bond, Spring Green, WI (US); Roger P. Stanek, Spring Green, WI (US); Wayne L. Hoffman, Spring Green, WI (US)

(73) Assignee: Cardinal CG Company, Eden Prairie, MN (US)

( * ) Notice: Subject to any disclaimer, the term of this patent is extended or adjusted under 35 U.S.C. 154(b) by 0 days.

(21) Appl. No.: 11/102,412

(22) Filed: Apr. 7, 2005

(65) Prior Publication Data

US 2005/0266160 A1   Dec. 1, 2005

Related U.S. Application Data

(60) Division of application No. 10/724,485, filed on Nov. 28, 2003, now Pat. No. 6,942,917, which is a continuation of application No. 09/189,284, filed on Nov. 10, 1998, now Pat. No. 6,673,438, which is a division of application No. 08/547,690, filed on Oct. 19, 1995, now Pat. No. 5,834,103, which is a continuation of application No. 08/237,931, filed on May 3, 1994, now abandoned.

(51) Int. Cl.
    *H01L 21/469* (2006.01)

(52) U.S. Cl. ............ 438/758; 427/164; 427/178; 427/204; 427/219; 428/336; 428/216; 428/469; 428/472; 359/359; 359/580

(58) Field of Classification Search ........ 427/164, 427/178, 204, 219; 438/758; 428/336, 216, 428/469, 472; 359/359, 580
    See application file for complete search history.

(56) References Cited

U.S. PATENT DOCUMENTS

| 3,721,584 A | 3/1973 | Diem ............... 359/580 |
| 3,885,855 A | 5/1975 | Gross .............. 359/360 |
| 3,895,155 A | 7/1975 | Shukuri ............ 428/206 |
| 3,996,461 A | 12/1976 | Sulzbach .......... 250/214 |
| 4,166,018 A | 8/1979 | Chapin ............. 204/192 |
| 4,187,336 A | 2/1980 | Gordon ............. 428/34 |
| 4,262,056 A | 4/1981 | Hubler ............. 428/446 |
| 4,308,316 A | 12/1981 | Gordon ............. 428/336 |
| 4,319,803 A | 3/1982 | Burmeister ........ 385/128 |
| 4,377,613 A * | 3/1983 | Gordon ............ 428/212 |
| 4,515,151 A | 5/1985 | Slemmons .......... 126/709 |
| 4,546,050 A | 10/1985 | Amberger ......... 428/630 |
| 4,609,267 A | 9/1986 | Deguchi ........... 351/163 |

(Continued)

FOREIGN PATENT DOCUMENTS

EP   0456488   11/1991

(Continued)

OTHER PUBLICATIONS

AIRCO Coating Technology Symposium Proceedings, (Mar. 1990).

(Continued)

*Primary Examiner*—Mohsen Ahmadi
(74) *Attorney, Agent, or Firm*—Fredrikson & Byron, P.A.

(57) ABSTRACT

Transparent articles comprising transparent, nonmetallic substrate and a transparent film stack is sputter deposited on the substrate. The film stack is characterized by including at least one infrared reflective metal film, a dielectric film over the metal film, and a protective silicon nitride film of 10 Å to 150 Å in thickness over the said dielectric film. The dielectric film desirably has substantially the same index of refraction as does silicon nitride and is contiguous with the silicon nitride film.

18 Claims, 1 Drawing Sheet

U.S. PATENT DOCUMENTS

| | | | | |
|---|---|---|---|---|
| 4,649,088 A | 3/1987 | Mitsui | | 428/697 |
| 4,716,086 A | 12/1987 | Gillery | | 428/630 |
| 4,780,372 A | 10/1988 | Tracy | | 428/428 |
| 4,786,563 A | 11/1988 | Gillery | | 428/630 |
| 4,796,291 A | 1/1989 | Makino | | 455/415 |
| 4,806,220 A | 2/1989 | Finley | | 204/192.27 |
| 4,826,525 A | 5/1989 | Chesworth | | 65/60.2 |
| 4,828,346 A | 5/1989 | Jacobsen | | 359/360 |
| 4,855,186 A | 8/1989 | Grolig | | 427/539 |
| 4,859,532 A | 8/1989 | Oyama | | 428/336 |
| 4,861,669 A | 8/1989 | Gillery | | 428/434 |
| 4,898,789 A | 2/1990 | Finley | | 428/623 |
| 4,900,633 A | 2/1990 | Gillery | | 428/432 |
| 4,902,081 A | 2/1990 | Huffer | | 359/360 |
| 4,920,006 A | 4/1990 | Gillery | | 428/432 |
| 4,938,857 A | 7/1990 | Gillery | | 204/192.27 |
| 4,946,712 A | 8/1990 | Goodman | | 427/166 |
| 4,965,121 A | 10/1990 | Young | | 359/360 |
| 5,000,528 A | 3/1991 | Kawakatsu | | 359/585 |
| 5,059,295 A | 10/1991 | Finley | | 204/192.27 |
| 5,091,244 A | 2/1992 | Biornard | | 428/216 |
| 5,110,662 A | 5/1992 | Depauw | | 428/192 |
| 5,119,231 A | 6/1992 | Nelson | | 359/359 |
| 5,135,808 A | 8/1992 | Kimock | | 428/336 |
| 5,153,054 A | 10/1992 | Depauw | | 428/216 |
| 5,168,003 A | 12/1992 | Proscia | | 428/216 |
| 5,190,807 A | 3/1993 | Kimock | | 428/216 |
| 5,217,753 A | 6/1993 | Goodman | | 427/166 |
| 5,234,748 A | 8/1993 | Demiryont | | 428/216 |
| 5,239,406 A | 8/1993 | Lynam | | 359/275 |
| 5,242,560 A | 9/1993 | Lingle | | 204/192.27 |
| 5,248,545 A | 9/1993 | Proscia | | 428/212 |
| 5,254,392 A | 10/1993 | Burns | | 428/212 |
| 5,262,633 A | 11/1993 | Kasai | | 250/208.1 |
| 5,279,722 A | 1/1994 | Szcyzbowski | | 204/192.27 |
| 5,296,302 A * | 3/1994 | O'Shaughnessy et al. | | 428/472 |
| 5,298,048 A | 3/1994 | Lingle | | 65/60.2 |
| 5,318,685 A | 6/1994 | O'Shaughnessy | | 204/192.27 |
| 5,342,676 A | 8/1994 | Zagdoun | | 428/216 |
| 5,344,718 A | 9/1994 | Hartig | | 428/623 |
| 5,376,455 A | 12/1994 | Hartig | | 428/428 |
| 5,377,045 A | 12/1994 | Wolfe | | 359/585 |
| 5,398,133 A | 3/1995 | Tsai | | 359/589 |
| 5,411,794 A | 5/1995 | Kawaguchi | | 428/216 |
| 5,413,864 A | 5/1995 | Miyazaki | | 428/432 |
| 5,418,019 A | 5/1995 | Chen | | 427/579 |
| 5,425,861 A | 6/1995 | Hartig | | 204/192.26 |
| 5,433,988 A | 7/1995 | Fukuda | | 428/141 |
| 5,510,173 A | 4/1996 | Pass | | 428/216 |
| 5,520,996 A | 5/1996 | Balian | | 428/216 |
| 5,521,765 A | 5/1996 | Wolfe | | 359/885 |
| 5,543,229 A | 8/1996 | Ohsaki | | 428/432 |
| 5,552,180 A | 9/1996 | Finley | | 427/165 |
| 5,705,278 A | 1/1998 | Gillery | | 428/433 |
| 5,834,103 A | 11/1998 | Bond | | 428/216 |
| 6,274,244 B1 * | 8/2001 | Finley et al. | | 428/433 |
| 6,673,438 B1 | 1/2004 | Bond | | 428/336 |

FOREIGN PATENT DOCUMENTS

| | | |
|---|---|---|
| EP | 0500445 | 8/1992 |
| EP | 0546302 | 6/1993 |
| EP | 0567735 | 11/1993 |
| EP | 0 718 250 | 6/1996 |
| FR | 2579197 | 9/1986 |
| JP | 7232369 | 5/1972 |
| JP | 56104928 | 1/1983 |
| JP | 63100043 | 2/1988 |
| WO | WO 9320256 | 10/1993 |

OTHER PUBLICATIONS

Pawlewicz et al., "Multilayer Optical Coating Fabrication by D.C. Magnetron Reactive Sputtering" Proc. SPIE-Int. Soc. Opt. Eng. (1986).

Beister et al., "Advanced Layer Systems and Coating Techniques for Large-Area Glass Coatings by High-Rate Sputtering" Glastech. Ber. (1993) pp. 175-183.

Koss et al., "Design of Selective Transmissive/reflective Coatings for Windows" J. Vac. Sci. Technol., A (1992) pp. 1892-1896.

McCarthy et al., "Deposition of Dielectric Optical Coatings: A Microstructural Study of the Deposited Layers and Interfaces" Mater. Res. Soc. Symp. Proc. (1989).

* cited by examiner

TRANSPARENT ARTICLE HAVING PROTECTIVE SILICON NITRIDE FILM

RELATED APPLICATIONS

This is a divisional of application Ser. No. 10/724,485, filed Nov. 28, 2003, now U.S. Pat. No. 6,942,917 which in turn is a continuation application of application Ser. No. 09/189,284, filed Nov. 10, 1998, now U.S. Pat. No. 6,673,438, which in turn is a divisional of application Ser. No. 08/547,690 filed Oct. 19, 1995, now U.S. Pat. No. 5,834,103, which in turn is a continuation of application Ser. No. 08/237,931 filed May 3, 1994, now abandoned all of which are incorporated by reference herein.

FIELD OF THE INVENTION

This invention is directed to transparent coatings for substrates and particularly to transparent coatings that are physically and chemically resistant.

BACKGROUND OF THE INVENTION

Glass and similar transparent substrates can be coated with transparent films to alter the optical properties of the glass. High visible transmittance, low emissivity coatings are characterized by their ability to transmit visible light while minimizing the transmittance of other wavelengths of light, particularly light in the infrared spectrum. This characteristic is useful for minimizing radiative heat transfer without impairing visibility, and coatings of this type find utility in architectural glass or automobile windows. It is often desired to maintain reflectance relatively consistent throughout the visible spectrum so that the coating has a "neutral" color; that is, colorless.

Generally speaking, coatings on glass that are provided for high transmittance and low emissivity comprise a stack of films having one or more thin metallic films with high infrared reflectance and low transmissivity that are disposed between antireflective dielectric layers that commonly are metal oxide films. The metal oxide layers serve to reduce visible reflection of the film stack to enhance transmittance, and are characterized by relatively high indices of refraction, commonly on the order of 1.9 or more.

Thin, transparent metal films of silver, copper and the like are susceptible to corrosion (e.g., staining) when they are brought into contact, under moist or wet conditions, with various staining agents such as atmosphere-carried chlorides, sulfides, sulfur dioxide and the like. Films of this type commonly are employed on inner surfaces of multi-pane glass units so that the films are maintained in a dry condition by desiccants or the like that remove moisture from the interpane spaces. Staining can occur when coated panes of glass are stored for later fabrication into insulating glass units.

Film stacks frequently are isolated from contact with the environment, and a film stack of the type described may be positioned on one of the inner surfaces of a multipane insulating glass unit. However, when glass panes bearing coating stacks are transported or assembled into multipane units, they often are subjected to relatively harsh conditions which may cause physical marring of the film stacks.

Film stacks commonly are provided on glass sheets on a commercial production basis through the use of magnetron sputtering techniques such as those described in Chapin, U.S. Pat. No. 4,166,018.

Gillery, et al. U.S. Pat. No. 4,786,563 suggests the use of a thin overcoat of titanium dioxide as a protective layer. Titanium oxide overcoats may be particularly prone to scratching or abrasion during shipping and washing operations, however, rendering the glass panes commercially unsuitable for use. O'Shaughnessy, et al. U.S. Pat. No. 5,296,302 corrects the problem by providing a protective overcoat of an oxide such as zinc oxide, the latter being relatively very thin in comparison to other films in the stack, and protective overcoats of this type having thicknesses in the range of 10–40 Å are disclosed.

High transmittance, low emissivity film stacks of the type described in U.S. Pat. No. 5,296,302, despite their excellent resistance to scratching, nonetheless have experienced problems in connection with the tarnishing or other discoloration of the reflective metal layers, which commonly are silver. Moreover, since the sputter deposition of certain films such as titanium oxide proceeds more slowly than zinc oxide, for example, it would be desirable to avoid the presence of titanium oxide films of thicknesses greater than, for example, 30 Å.

It would be desirable to provide such film stacks with protection not only against physical damage (e.g., scratching) but also against tarnishing or discoloration of the metal reflective layers employed in such film stacks.

SUMMARY OF THE INVENTION

We have found that application of a thin sputtered-on film of a compound of silicon and nitrogen such as silicon nitride as a protective film in a film stack provides the underlying metal (e.g., silver) metal film(s) with excellent resistance to corrosion while at the same time providing the underlying stack with resistance to physical marring, all without substantial effect upon optical properties of the stack. Preferably, the film directly beneath the silicon nitride protective film is a dielectric film having an index of refraction substantially the same as that of silicon nitride, that is, about 2.0±0.1. The film directly beneath the silicon nitride film may be of a metal oxide such as an oxide of zinc or tin or alloys thereof, these oxides having substantially the same index of refraction. In this manner, the optical properties of a given film stack may be adjusted by adjusting the thickness of the contiguous, combined zinc oxide/silicon nitride films. Desirably, the silicon nitride film is at least 10 Å thick, and is present at a thickness less than 150 Å, preferably not greater than 100 Å and most preferably not greater than about 50 Å. Although the film stack may have thin (usually not greater than about 20 Å) sacrificial or shielding films of titanium compounds such as titanium oxide, the stack desirably is free of titanium-containing films having thicknesses greater than about 30 Å.

In one embodiment, the invention comprises a transparent support such as glass having a transparent film stack sputter deposited upon it, the film stack comprising a reflective metal film, a dielectric film over the metal film, and a thin (10 Å–150 Å) protective silicon nitride film over the dielectric film. In another embodiment, the invention relates to a transparent article having a pair of reflective metal films separated by a dielectric film, the film stack including an outer dielectric film and a thin protective film of silicon nitride over the outer dielectric film. Desirably, the dielectric film immediately beneath the protective silicon nitride film is a metal oxide film such as zinc oxide or tin oxide that has an index of refraction substantially the same as that of the silicon nitride so that the outer dielectric film and the silicon nitride film can be treated as a single film for adjusting optical properties of the stack.

DETAILED DESCRIPTION OF THE PREFERRED EMBODIMENT

Figure 1:
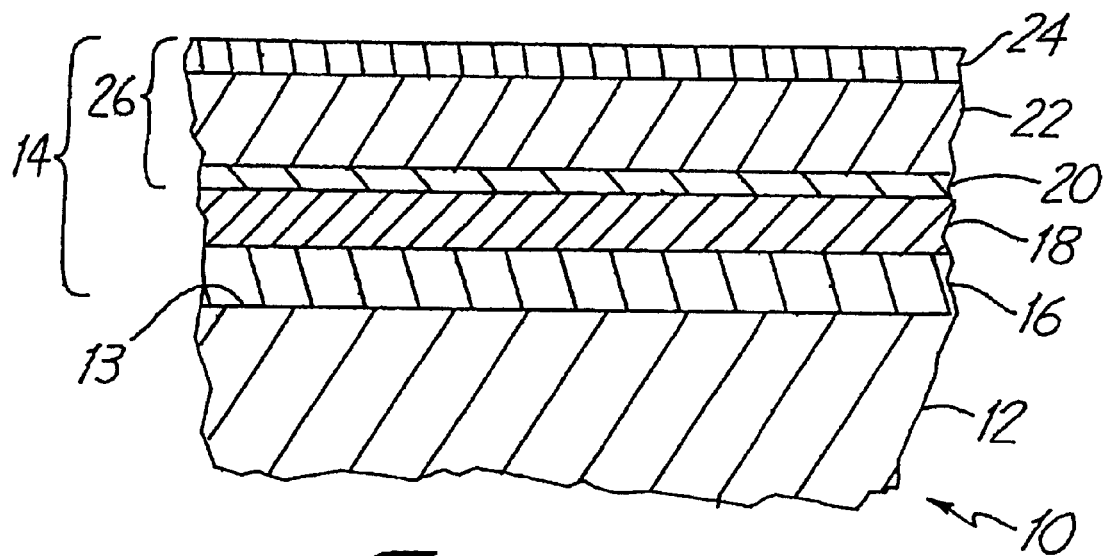
FIG. 1 is a schematic view of a substrate coated with a film stack of the invention according to one embodiment of the invention.

Referring first to FIG. 1, a transparent article 10 is shown as comprising a glass sheet 12 bearing a film stack 14. The film stack 14 may be manufactured by any convenient method, but magnetron sputtering techniques of the type described in U.S. Pat. No. 4,166,018, the teachings of which are incorporated herein by reference, are preferred. In this method, the glass sheet 12 is transported through a series of low pressure zones in which the various films which make up the film stack 14 are sequentially applied. Metallic films are sputtered from metallic sources or "targets". Metal oxide or metal nitride films may be formed by sputtering the metal in a reactive oxygen or nitrogen atmosphere, or by first sputtering the metal on a substrate to form a film and then subjecting the metal film to a reactive atmosphere of oxygen or nitrogen. If desired, two or more contiguous films of different metal oxides may be used instead of a single metal oxide film. Magnetron sputtering techniques are well known in the art and need not be described here in detail.

With reference to FIG. 1, upon the surface 13 of the glass pane 12 is sputter deposited a first antireflective film 16 of sufficient thickness to reduce or eliminate any reflectance which may arise from the interface between the following metal film 18 and the glass substrate 12. Appropriate metal oxides for use in film 16 include zinc oxide, tin oxide, indium oxide, bismuth oxide, titanium oxide, hafnium oxide, and zirconium oxide, and combinations thereof, but in a particularly preferred embodiment, the inner metal oxide film 16 is formed of zinc oxide at a thickness in the range of 120–700 Å, and preferably in the range of 300–700 Å.

Following sputter deposition of the metal oxide film 16, a reflective metal film 18 such as silver, gold, copper or aluminum is sputter deposited, the metal preferably being silver deposited at a thickness in the range of about 70 Å to about 150 Å with a thickness of about 110 Å being most preferred. The resulting metallic silver film, if not protected, will react with such reactive gasses as oxygen if not protected. Hence, directly upon the metal film 18 is sputter deposited a thin sacrificial metal film (referred to herein as a "shielding" film) such as titanium, the metal film 20 serving to shield and thus protect the underlying silver film 18 during the sputter deposition, in this example, of a following metal oxide film 22 and thus preventing the silver film from becoming oxidized. The resulting film 20 thus is formed directly by the application of a thin film of titanium metal directly to the reflective silver film 18, followed by oxidation of the titanium film. When the overlying metal oxide film 22 is applied by sputtering a metal in a reactive oxygen atmosphere, the titanium metal film oxidizes to form a titanium oxide and thus serves to shield the underlying silver film. Applying a shielding titanium film at about 20 Å has been found to work well and, as mentioned, leads to the formation of a titanium oxide film 20.

In the embodiment depicted in FIG. 1, the next film to be applied is a dielectric antireflective film that is desirably a metal oxide and most desirably has an index of refraction substantially identical to that of silicon nitride. The indices of refraction of silicon nitride and zinc oxide or tin oxide, for example, are substantially identical. The dielectric antireflective film 22 may have a thickness in the range of 150–350 Å.

Finally, over the antireflective dielectric film 22 is sputter deposited a thin film 24 of silicon nitride, the latter desirably being sputter deposited from a silicon target (suitably doped to render it conductive) in a nitrogen atmosphere. The thin silicon nitride film can be present in any thickness which does not unduly interfere with the optical properties of the sheet, and silicon nitride thicknesses in the range of about 10 Å to about 150 Å are appropriate. It is generally desired that the silicon nitride film not be thicker than about 50 Å.

If the silicon nitride film 24 and the underlying dielectric layer 22 have substantially the same index of refraction and are contiguous, then these two films can be treated as a single film 26 for the purpose of determining and adjusting the optical properties of the film stack 14. That is, the relative thicknesses of the films 22 and 24 in this instance will have little, if any, effect upon the optical properties of the film stack; rather, it is the thickness of these films combined that can be adjusted to provide the desired optical properties. The combined thickness of the films 22 and 24 in this instance desirably will be in the range of about 250 to about 400 Å. For film stacks having only a single reflective metal film such as the stack depicted in FIG. 1, a combined thickness of films 22 and 24 of 300–350 Å is preferred, whereas for film stacks using two or more metal reflective layers such as the stack depicted in FIG. 2, a combined thickness of films 22' and 24' of 275–325 Å is preferred.

Figure 2:
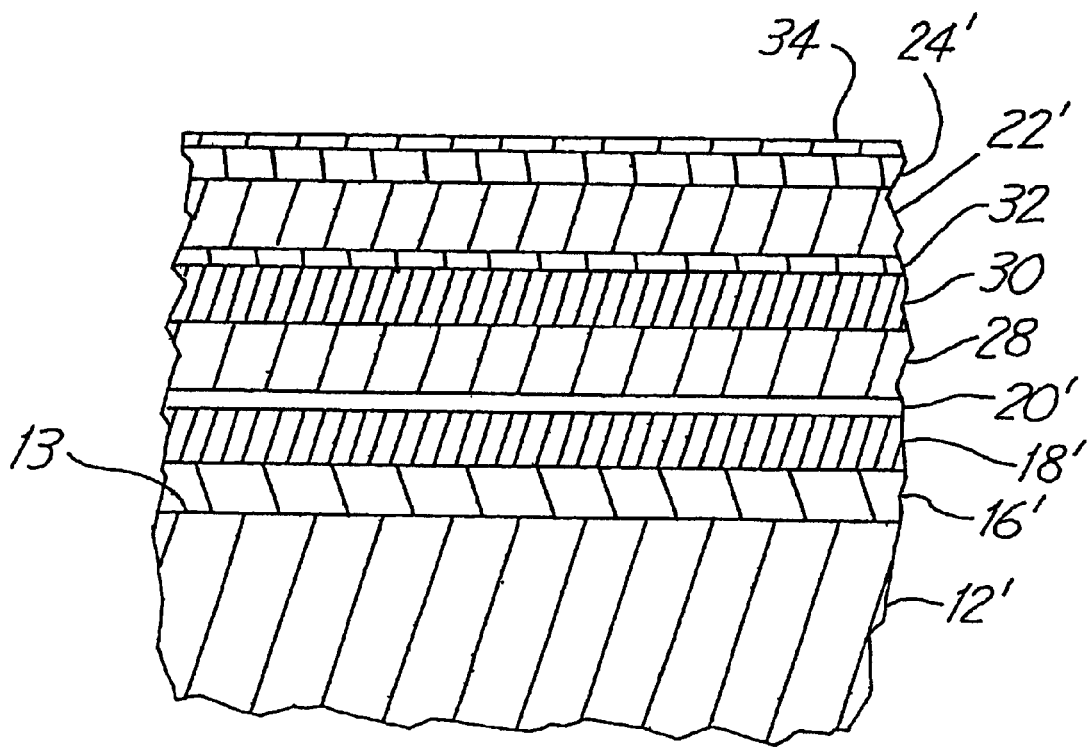
FIG. 2 is a schematic view of a substrate coated with a film stack according to another embodiment of the invention.

Referring now to FIG. 2, an embodiment similar to that of FIG. 1 is shown except that the series of films 18, 20 and 22 are repeated, although not necessarily at the same thickness. Elements similar to those shown in FIG. 1 are given the same numbers, primed.

In FIG. 2, a transparent support 12 such as glass is provided with a first dielectric antireflective film 16' followed by an infrared reflective metal film 18' such as silver. Atop the silver film is sputter deposited a thin titanium metal shielding film which is subsequently oxidized to titanium oxide, then the next antireflective dielectric film 28, in the form of, for example, zinc oxide is applied. Thereafter, a metal film 30 is applied that is similar to film 18', followed by a titanium shielding film which is oxidized subsequently to titanium oxide and designated 32, followed by the dielectric antireflective film such as a zinc oxide film 22'. Over the dielectric film 22' is placed a thin silicon nitride protective film designated 24'.

Although it is desired that the silicon nitride film 24, 24' be the outermost or overcoat film of the film stack, it may on occasion be desirable to add a subsequent thin, highly scratch-resistant film 34 such as a film of zinc oxide as reported in U.S. Pat. No. 5,296,302, the teachings of which are incorporated herein by reference. The latter film 34 desirably is applied at a thickness in the range of about 10 to about 40 Å and does not significantly affect the optical properties of the remainder of the stack. The overcoat 34, although desirably of zinc oxide, may be formed of an oxide of a metal selected from the group consisting of tin, indium, bismuth and alloys thereof.

Film stacks of the type depicted in FIGS. 1 and 2 may be sputter deposited to form the sequential films of the type and thicknesses set out in the following Tables 1 and 2. Zinc oxide was sputter deposited from a zinc target in an atmosphere containing oxygen, and silicon nitride was sputter deposited from a doped silicon target in an atmosphere containing nitrogen. Of course, additional films such as titanium nitride, titanium, stainless steel and other metals, and oxides of metals can be employed as desired, but it is desired that the films listed in Tables 1 and 2 be contiguous to each other.

TABLE 1

| Material | Thickness, Å |
|---|---|
| Glass | |
| Zinc Oxide | 370 |
| Silver | 110 |
| Titanium* | 20 |
| Zinc Oxide | 225 |
| Silicon Nitride | 100 |

TABLE 2

| Material | Thickness, Å |
|---|---|
| Glass | |
| Zinc Oxide | 120 |
| Silver | 110 |
| Titanium* | 20 |
| Zinc Oxide | 600 |
| Silver | 110 |
| Titanium* | 20 |
| Zinc Oxide | 230 |
| Silicon Nitride | 100 |

*Shielding film that is subsequently converted to titanium oxide

Film stacks of the type described, utilizing a silicon nitride protective overcoat having a thickness in the range of about 10 Å to about 150 Å, have been demonstrated to show superior results in comparison to film stacks of the type depicted in U.S. Pat. No. 5,296,302 with respect to resistance to discoloring of the metal films. In one series of tests, glass sheets with the film stacks of approximately the same constitution as shown in Tables 1 and 2 were subjected to severe weatherability tests: Racks of the coated glass sheets separated by small polystyrene beads were placed in an enclosed space and subjected to cycles of high humidity and temperature (each period being 16 hours at 90° F. and 60% relative humidity) and relatively low temperature and humidity (8 hours at 65–70° F., 30% relative humidity). After 21 days (21 cycles), the film stacks having the silicon nitride overcoat were visibly unchanged, whereas the other film stacks exhibited commercially unacceptable spotting associated with damage to the silver layers.

While a preferred embodiment of the present invention has been described, it should be understood that various changes, adaptations and modifications may be made therein without departing from the spirit of the invention and the scope of the appended claims.

What is claimed is:

1. A method of making a transparent article comprising: providing a transparent, non-metallic substrate; and depositing upon the substrate, in sequence, a first dielectric film, a metal film, a second dielectric film of a metal oxide, and a protective film of silicon nitride having a thickness in the range of 10 to 100 Å.

2. The method of claim 1 wherein the second dielectric film has an index of refraction essentially the same as that of silicon nitride.

3. The method of claim 2 wherein said second dielectric film and the silicon nitride film are contiguous.

4. The method of claim 1 wherein the combined thickness of said second dielectric film and the silicon nitride protective film ranges from about 250 to 400 Å.

5. The method of claim 4 wherein the combined thickness of said second dielectric film and said silicon nitride film is 300–350 Å.

6. The method of claim 5 wherein the combined thickness of said second dielectric film and said silicon nitride film is 275–325 Å.

7. The method of claim 1 wherein the metal film is silver.

8. The method of claim 7, wherein the metal film of silver is 70–100 Å.

9. The method of claim 1 wherein said metal oxide is zinc oxide or titanium dioxide.

10. The method of claim 1, wherein the metal film is 70–100 Å.

11. A method of making a transparent article comprising: providing a transparent, non-metallic substrate; and depositing upon the substrate, in sequence, a dielectric film contiguous to the transparent substrate, a metal film, a shielding film contiguous to the metal film, a metal oxide film, and a protective film of from 10 Å to 100 Å of silicon nitride contiguous to said metal oxide film.

12. The method of claim 11 wherein the metal film is silver.

13. The method of claim 12, wherein the metal film of silver is 70–100 Å.

14. The method of claim 11 wherein the index of refraction of the metal oxide film is essentially the same as silicon nitride.

15. The method of claim 11 wherein the shielding film and the metal oxide film are contiguous.

16. The method of claim 11 wherein the metal oxide film is zinc oxide or titanium dioxide.

17. The method of claim 11, wherein the metal film is 70–100 Å.

18. The method of claim 11 wherein the combined thickness of said second dielectric film and the silicon nitride protective film ranges from about 250 to 400 Å.

* * * * *